June 27, 1967 T. F. SARAH 3,327,963
LATCH MECHANISM FOR THE LINE PICKUP
DEVICES IN SPINNING REELS
Filed Aug. 24, 1965 6 Sheets-Sheet 1

INVENTOR.
THOMAS F. SARAH
BY Hamilton & Cook
ATTORNEYS

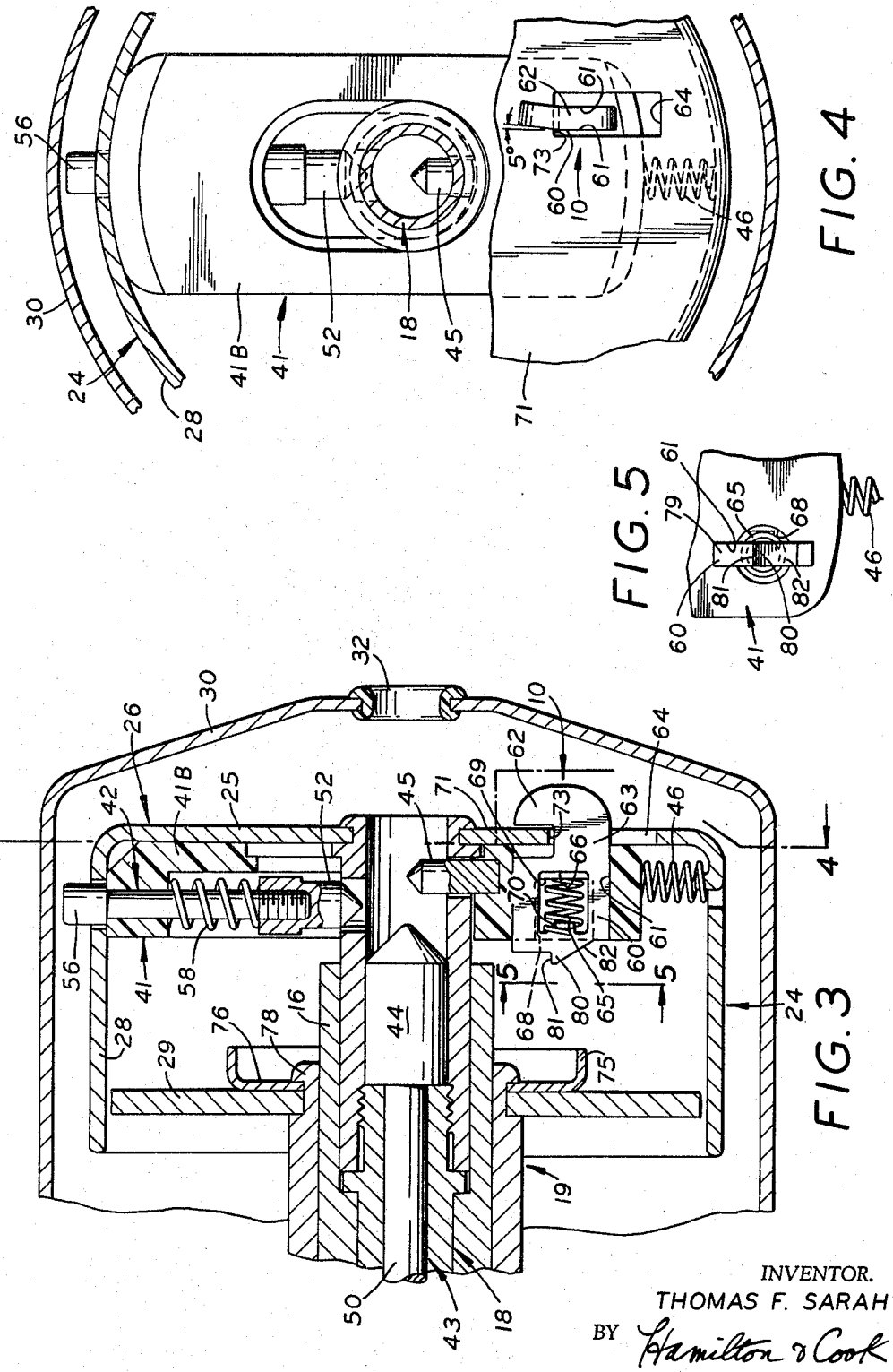

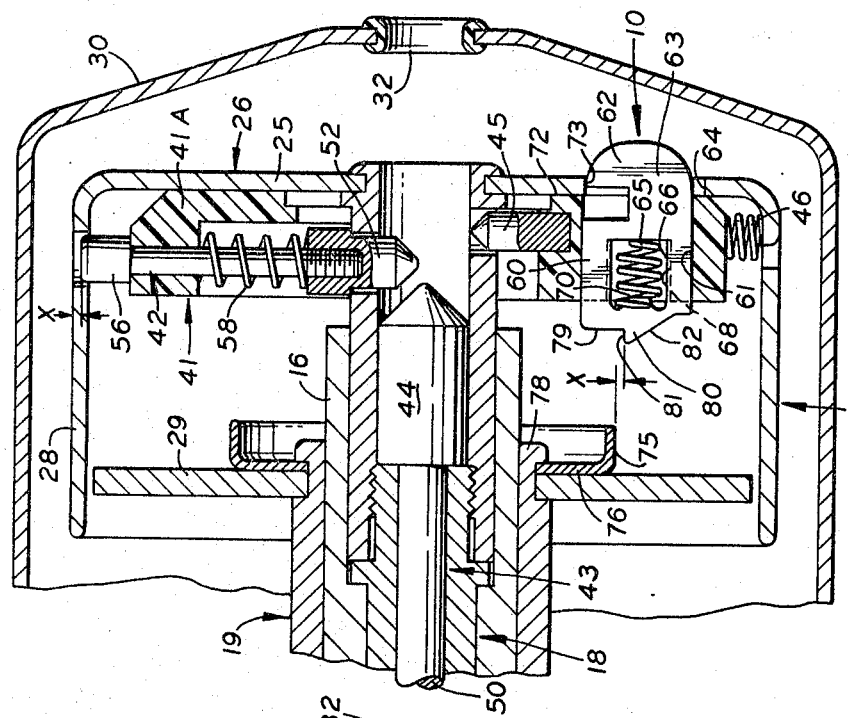

June 27, 1967

T. F. SARAH 3,327,963

LATCH MECHANISM FOR THE LINE PICKUP
DEVICES IN SPINNING REELS

Filed Aug. 24, 1965

INVENTOR.
THOMAS F. SARAH
BY Hamilton & Cook
ATTORNEYS

June 27, 1967

T. F. SARAH 3,327,963

LATCH MECHANISM FOR THE LINE PICKUP
DEVICES IN SPINNING REELS

Filed Aug. 24, 1965

INVENTOR.
THOMAS F. SARAH
BY Hamilton & Cook

ATTORNEYS

INVENTOR.
THOMAS F. SARAH
BY Hamilton & Cook
ATTORNEYS

United States Patent Office 3,327,963
Patented June 27, 1967

3,327,963
LATCH MECHANISM FOR THE LINE PICKUP
DEVICES IN SPINNING REELS
Thomas F. Sarah, Akron, Ohio, assignor to Pflueger
Corporation, Akron, Ohio, a corporation of Ohio
Filed Aug. 24, 1965, Ser. No. 482,130
10 Claims. (Cl. 242—84.21)

The present invention relates generally to fishing reels of the spinning type. More particularly, the present invention relates to fishing reels having a normally nonrotatable spool and a radially enclosed rotatable flyer from which a line pickup device is radially extensible to wind the line onto the spool and retractable to permit the line to uncoil off the spool. Specifically, the present invention relates to the latch mechanism by which the pickup device is retained in retracted position and selectively released.

The spinning reel with its normally nonrotatable spool from which the line uncoils during the cast has achieved widespread acceptance, particularly because it eliminates backlash which so frequently occurs with the type of reel in which the spool rotates to pay out the line during the cast.

Moreover, the spinning reel has garnered even more advocates because it is as readily usable on a casting rod, fly rod or specialized spinning rod.

Generally, all spinning reels may be classified according to three characteristics. They are open faced or closed face, finger snubbed or mechanically snubbed, and undermounted or overmounted.

The open faced or closed face characteristic refers to the exposure of the spool. The closed reels are usually provided with a cover cap, or the like, which encompasses the spool and permits exit of the line through an eyelet. Such a construction is advantageous in that the coils peeling off of the spool are confined within the cover cap so that the line reaches the first line guide on the fishing rod traveling in almost a straight line and therefore there is little or no opportunity for the line to tangle itself about the line guide on the rod. However, so confining the coils does add to the frictional resistance against the line as it pays out. In open faced reel constructions there is either no cover cap at all or the cover cap has an eyelet of relatively large diameter and the coils peeling off of the spool during the cast are not confined within the reel, thus reducing friction at the reel. However, the line is often still in a partial coil as it reaches the first guide line on the rod and the first guide line must therefore be of increased diameter to reduce friction. With open faced reels it is found necessary to provide at least the first line guide with sloping protectors extending from the rod to the outermost portion of the guide to prevent the line from coilingly encircling the guide and binding thereon.

Overmounted and undermounted refers to the position in which the reel is mounted with respect to the rod. When a fisherman is standing with his fishing rod in his casting hand and the tip of the rod is pointed forwardly away from him, if the reel is on the top, or upper side, of the rod, he is using an overmounted reel. If the reel is underneath, or on the lower side, of the rod, he is using an undermounted reel.

The finger snubbed reel requires that the fisherman use one or more fingers to engage, or snub, the line both to control the release and flight of the line. Most early spinning reel constructions embodied this concept. However, these constructions generally required the fisherman to use two hands in preparing the reel for the cast. To facilitate the ease of operation, constructions were developed wherein the line was mechanically snubbed by pinching the line between two elements. Such constructions were operative by one hand, but the pinching of the line both to prevent the line from paying off the spool until the desired time in the casting procedure and to snub the line at the desired time after the cast to control the flight subjected the line to serious abrading.

In my copending U.S. application, Ser. No. 482,174 filed August 24, 1965, a mechanism is disclosed whereby the line is snubbed preparatory to the cast, released for the cast and selectively snubbed after the cast for controlling the flight by a mechanism actuated solely by the fingers of the casting hand and without pinching, or otherwise abrading, the line. As indicated in my aforesaid U.S. application, Ser. No. 482,174, a latch mechanism was required but no particular latch construction was critical thereto.

It is therefore the primary object of the present invention to provide a latch mechanism whereby the line pickup device is retained in retracted position and released, as desired.

It is another object of the present invention to provide a latch mechanism, as above, which may be utilized in a spinning reel having an axially reciprocal as well as an axially fixed line spool.

It is a further object of the present invention to provide a latch mechanism, as above, which is as readily adaptable to a line pinching snubber as well as a non-pinching line snubber.

It is an even further object of the present invention to provide a latch mechanism, as above, which is relatively uncomplicated and economical to produce.

These and other objects of the invention, as well as the advantages thereof over existing and prior art forms, will be apparent in view of the following detailed description of the attached drawings and are accomplished by means hereinafter described and claimed.

One preferred, and one alternative, embodiment is shown by way of example in the accompanying drawings and hereinafter described in detail without attempting to show all of the various forms and modifications in which the invention might be embodied; the invention being measured by the appended claims and not by the details of the specification.

In the drawings:

FIG. 3 is a further enlarged framentary area of FIG. 2 depicting the holder in the radially outer position with the pickup head extended;

FIG. 4 is a frontal elevation taken substantially on line 4—4 of FIG. 3;

FIG. 5 is a cross section taken substantially on line 5—5 of FIG. 3;

FIG. 6 is a view similar to FIG. 4 depicting the holder in the radially inner position and the pickup head extended;

FIG. 7 is a view similar to FIG. 6 depicting the pickup head retracted;

Figure 1:
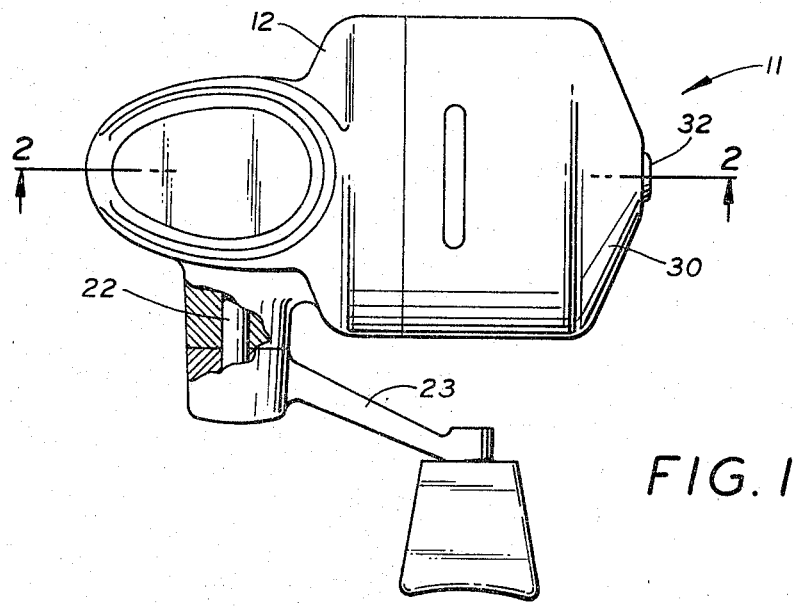
FIG. 1 is a top plan view of a spinning reel embodying the concept of the present invention.
Figure 2:
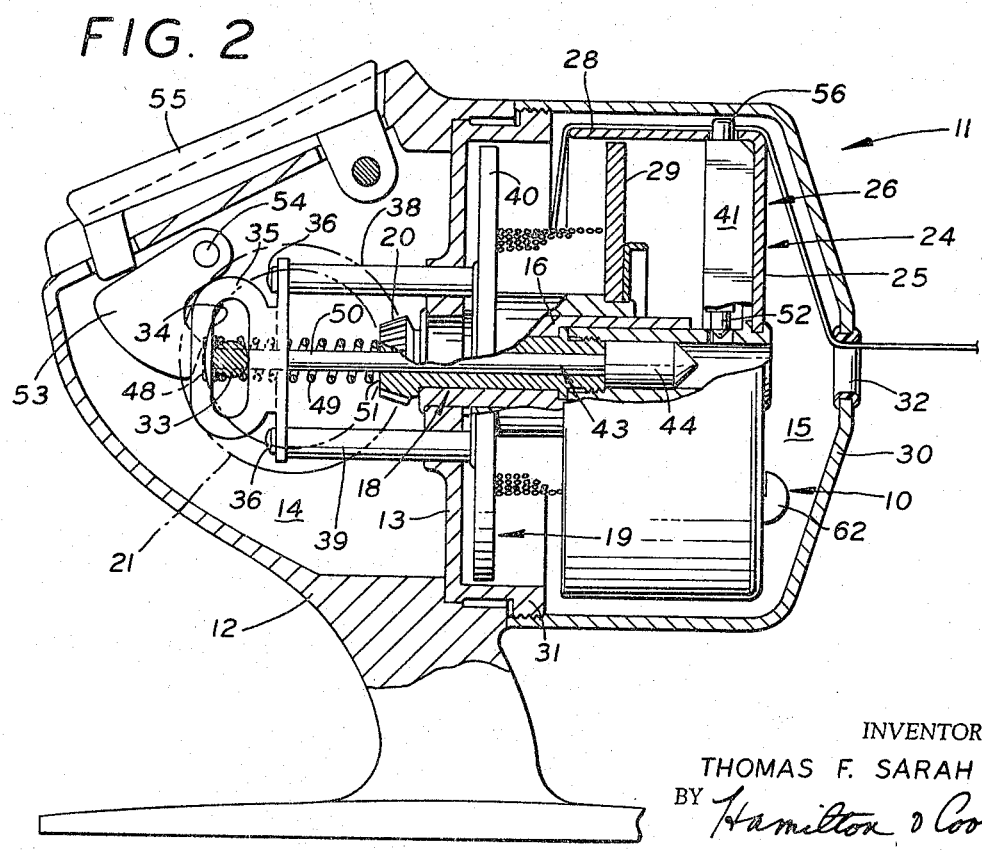
FIG. 2 is an enlarged cross section taken substantially on line 2—2 of FIG. 1.

In general, a reel constructed according to the concept of the present invention has a normally nonrotatable spool carried within the reel housing with a rotatable enclosed flyer mounted adjacent the outer, or line access, side of the spool. The flyer is comprised of a cup-shaped carrier, a holder and a pickup device rotatable to pick up and coil the line onto spool during the line retrieving operation.

The holder is mounted on the carrier to be slidable from a radially inner to a radially outer position. A spring means biases the holder to the outer position where it causes the pickup device to extend radially outwardly of the carrier. A mechanism is also provided which is operative from exteriorly of the housing to slide the holder from the outer to the inner position for retracting the pickup device.

A latch mechanism retains the holder in the inner position and selectively releases the holder. The present latch mechanism has a movable latch block with a pawl extending outwardly therefrom to lie adjacent the carrier when the holder is in outer position. When the holder is moved to the inner position a biasing means moves the pawl into engagement with a stop notch on the carrier so that the holder is locked in its inner position.

Thereafter, rotation of the carrier brings the lock block into contact with a releasing flange which releases the pawl from the stop notch and permits the holder to slide to its outer position.

Referring more particularly to the drawings, the improved latch mechanism, indicated generally by the numeral 10, is operatively mounted in a spinning reel 11.

The reel housing 12 is divided by an integral partition wall 13 into a gear compartment 14 and a spool compartment 15. A cover plate, not shown, on the side of the rear, preferably flattened, portion of the housing containing the gear compartment 14 provides access thereto.

Fixed to and extending forwardly of the partition wall 13 is a tubular bearing 16. Interiorly of the bearing 16 a drive shaft 18 is mounted for rotation. Exteriorly of the bearing 16 a line spool 19 is supported. The line spool is generally nonrotatable but may be selectively rotatable against the action of the drag mechanism, not shown.

The rear portion of the drive shaft extends through the partition wall 13 into the gear compartment 14 and mounts a bevel pinion 20 thereon. A bevel drive gear 21 meshes with pinion 20 and is mounted on a shaft 22 for rotation by the crank handle 23. The usual brake means and antireversing pawls may also be used, but since they form no part of the present invention and are not necessary to an environmental understanding of the present invention, they have not been depicted.

A flyer, indicated generally by the numeral 24, is fixedly mounted on the forward end of the drive shaft 18 for rotation therewith. Specifically, the base 25 of the cup-shaped carrier 26 is swaged, or otherwise suitably attached, to the drive shaft 18. The skirt 28 of the carrier 26 extends rearwardly over the front flange 29 of the spool 19.

A cap 30 is attached to the housing 12 to complete the spool compartment 15. The cap 30 may be attached to the housing in a number of ways. For example, it may be screwed onto the annular flange 31, as shown. The forward portion of the cap 30 is provided with a line guide, or eyelet, 32. The purpose of the eyelet 32, when utilizing a line pickup device as taught in my aforesaid copending U.S. application, Ser. No. 482,174, is merely to guide the line inwardly and outwardly of the spool compartment 15 and may, with such a construction, be of any diameter depending upon whether one desires an open faced or a closed face construction. However, the subject latch mechanism 10 may also be utilized with a reel employing elements which pinch the line for snubbing, and in such a construction a smaller diameter eyelet is often utilized.

In the preferred embodiment depicted herein the spool 19 is axially reciprocable on the bearing 16 to level wind the line, so marked, onto the spool. To reciprocate the spool 19 an eccentric pin 33 on the inner face of drive gear 21 rides in a cam slot 34 in bracket 35. The bracket 35 is attached, as by screws 36, to two posts 38 and 39 slidable through partition wall 13 and connected to the rear flange 40 of spool 19. Hence, rotation of gear 21 causes reciprocation of spool 19 at the same time the flyer 24 is rotated to wind the line onto the spool.

The above-described structure is well-known to the art and forms no part of the present invention, the description being set forth merely to provide an environmental understanding.

The unique holder 41 and pickup device 42 do not form a part of the present invention, being completely disclosed in my copending U.S. patent application, Ser. No. 482,174, but will be briefly described herein for further environmental understanding of the subject latch mechanism 10.

The holder 41 is slidably mounted on the base 25 of carrier 26 between a radially inner position 41A, as depicted in FIG. 7, and a radially outer position 41B, depicted in FIG. 3.

A plunger 43 is axially slidably received through drive shaft 18 with a plunger head 44 on the forwardmost end which engages a tumbler pin 45 when the plunger 43 is moved forwardly, to slide the holder from the outer position 41B to the inner position 41A. The latch mechanism 10 carried on the holder 41 retains the holder in the radially inner position 41A against the biasing action of spring 46.

The rearmost end of plunger 43 has a radially extending cap portion 48 and a compression spring 49 which encircles the plunger rod 50 and extends between the rearmost face 51 of the bevel pinion 20 and the cap portion 48 biasingly to urge the plunger 43 rearwardly out of contact with the tumbler pin 45 and the lifter rod 52.

A lever arm 53 is rockably mounted on a stud shaft 54 in the gear compartment 14 so as to be actuated by a push button 55 mounted to be operative from the exterior of the housing 12. The control means comprising the push button 55 and the lever arm 53 operate to move the plunger 43 forwardly against the biasing action of spring 49.

As the plunger 43 moves forwardly the head 44 engages the lifter rod 52 to maintain the pickup head 56 extended outwardly of the carrier 26 and sequentially engages the tumbler pin 45 to slide the holder to the inner position 41A where it is locked by the latch mechanism 10 (FIG. 6). The pickup head 56 remains extended until the plunger 43 is released, at which time the spring 58 biases the pickup head 56 to the retracted position depicted in FIG. 7. Subsequent forward movement of the plunger 43 will again extend the pickup head 56 outwardly of the carrier 26, as to snub the line during the cast for controlling the flight thereon. If a further explanation of the unique holder 41 and pickup device 42 is desired, reference may be had to the aforesaid copending patent application.

Turning now to the latch mechanism 10, a lock block 60 is axially slidably received in a way 61 provided through the holder 41. As shown in FIGS. 3–5, a sufficient portion of the way 61 matingly engages the block 60 so that it is restrained against rotation relative to the holder 41. Attached to and extending outwardly from the main body portion of the lock block 60 in spaced relation thereto is a pawl 62. The bridge portion 63 which connects the pawl 62 to the block 60 extends through an access slot 64 in the base 25 of carrier 26 to position the pawl 62 adjacent the base 25 on the side oppositely of the block 60. The pawl 62 is urged toward the base 25 by a spiral compression spring 65, which, as shown, may be positioned within the hollowed interior 66 of the lock block 60. In such a construction the way 61 is also bored, as at 68, to receive the spring 65 which will then bias the pawl 62 toward the base 25 by reacting between the base 69 of the bore 68 and the opposed positioning tab 70 extending inwardly of the hollowed interior 66.

In the outer position 41B of the holder the spring 65 holds the pawl 62 slidably against the forward face 71 of the carrier base 25, as shown in FIG. 3.

When the holder is slid from the outer to the inner position 41A, as shown in FIG. 6, the spring 65 causes the pawl 62 to enter the access slot 64. The pawl 62 is prevented from continuing further than the forward face 72 of the holder 41 by being twisted slightly out of alignment with the way 61—e.g., the 5° shown in FIG. 4—after assembly. The engagement of the pawl 62 with the stop notch 73 formed by the radially innermost side of access slot 64 prevents the spring 46 from moving the holder 41 to the outer position 41A even after the plunger head 44 has been retracted from contact with the tumbler pin 45.

In the preferred embodiment depicted, an annular release flange 75 is carried on, and movable axially with, the spool 19. The release flange 75 extends forwardly of the front spool flange 29 and may be attached directly thereto or may, by a web 76, be attached to the hub 78 of the spool 19, as shown. As the reciprocating spool 19 moves through its forward cycle the release flange 75 engages a drive wall 79 on the axially rear portion of the lock block 60 and displaces the pawl 62 forwardly out of contact with the stop notch 73.

Figure 8:
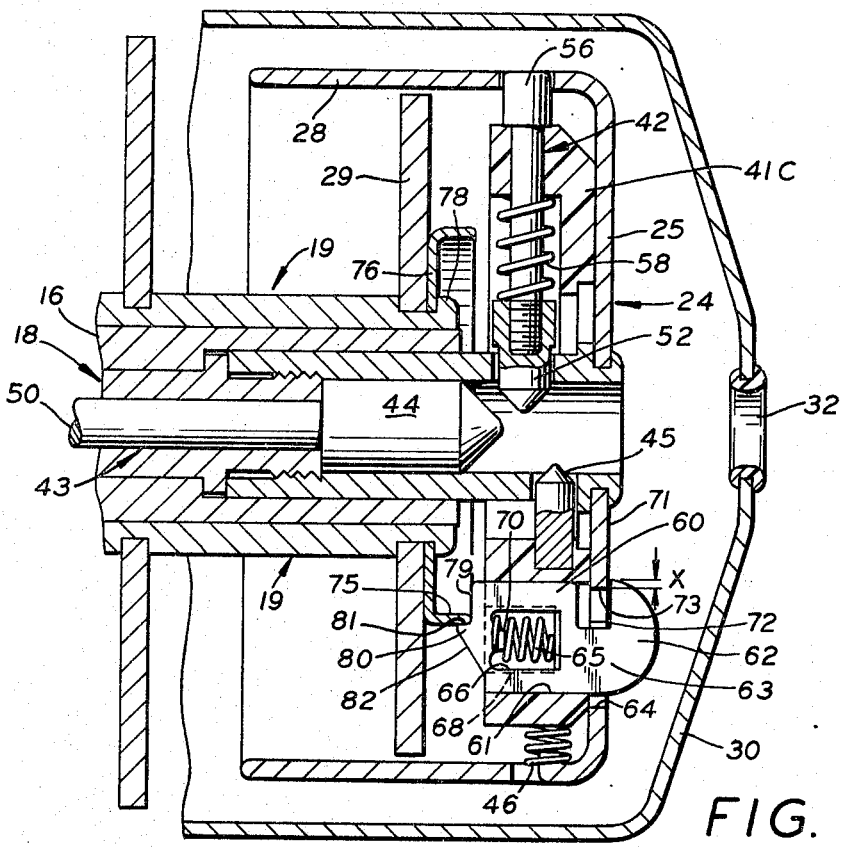
FIG. 8 is a view similar to FIG. 7 depicting the latch pawl disengaged and the holder in intermediate position with the pickup head retracted.

As the release flange 75 is moved forwardly it will be observed that it misses contact with a spur 80 on the lock block 60 by a clearing distance X. Thus, when the pawl 62 disengages from the stop notch 73 the spring 46 is able to move the holder toward the outer position 41B an amount equal to the clearing distance X. This intermediate position of the holder is depicted in FIG. 8 as 41C, and it will also be observed that the pawl 62 also moves an equal distance X so that it cannot re-engage the stop notch 73. Accordingly, as the reciprocating spool 19 moves through its rearward cycle and the release flange 75 clears the engaging surface 81 of the spur 80, the holder will be permitted to move from the intermediate position 41C to the outer position 41B.

The two staged release of the latch mechanism 10 described above not only prevents the re-engagement of the pawl 62 with the stop notch 73 as the release flange 75 is withdrawn but also provides a means for latching the holder 41 with the pickup head 56 retracted when the spool 19 is at the forwardmost position in its reciprocating cycle.

When the plunger 43 is actuated to slide the holder from the outer position 41B toward the inner position 41A while the spool is in its forwardmost position, the release flange 75 is engaged by the beveled cam surface 82 on spur 80. The cooperative engagement of the cam surface 82 and the release flange 75 moves the lock block 60 forwardly until the spur 80 clears the release flange 75. At that time the spring 65 moves the block 60 rearwardly until the drive wall 79 engages the release flange 75. In this situation only the engaging surface 81 abutting the release flange 75 retains the pickup head 56 withdrawn after the plunger 43 is released.

At this point it will be observed that the pickup head 56 must be retracted when the holder is in the intermediate position 41C to permit the line to uncoil off the spool 19, and to accomplish this purpose the pickup head 56 must be retracted at least the clearing distance X when the holder is in the inner position 41A (FIG. 7).

Figure 9:
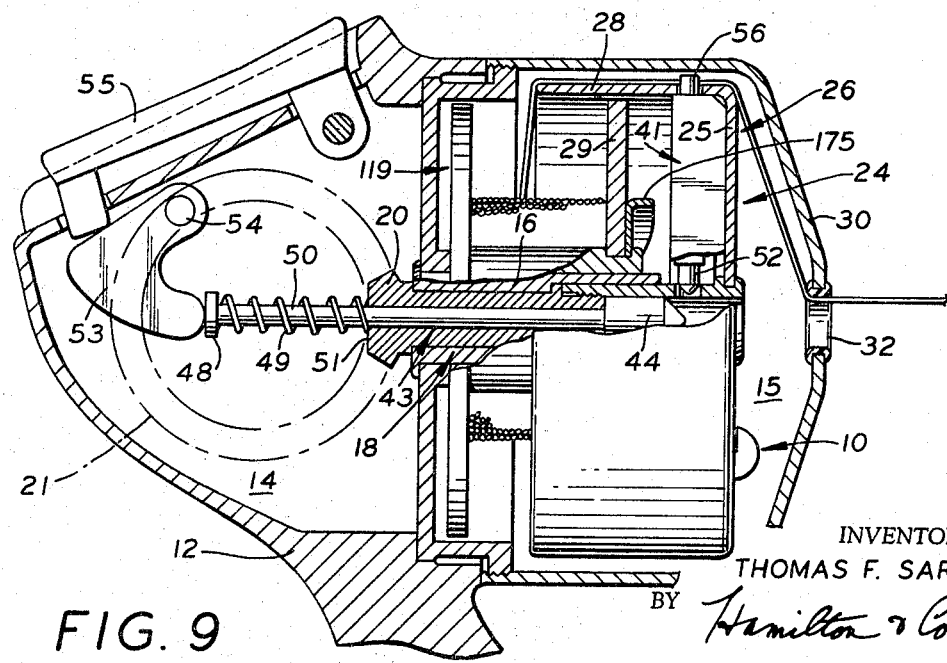
FIG. 9 is a view similar to FIG. 2 depicting an alternative construction of the subject latch mechanism with the holder in the radially outer position with the pickup head extended.
Figure 10:
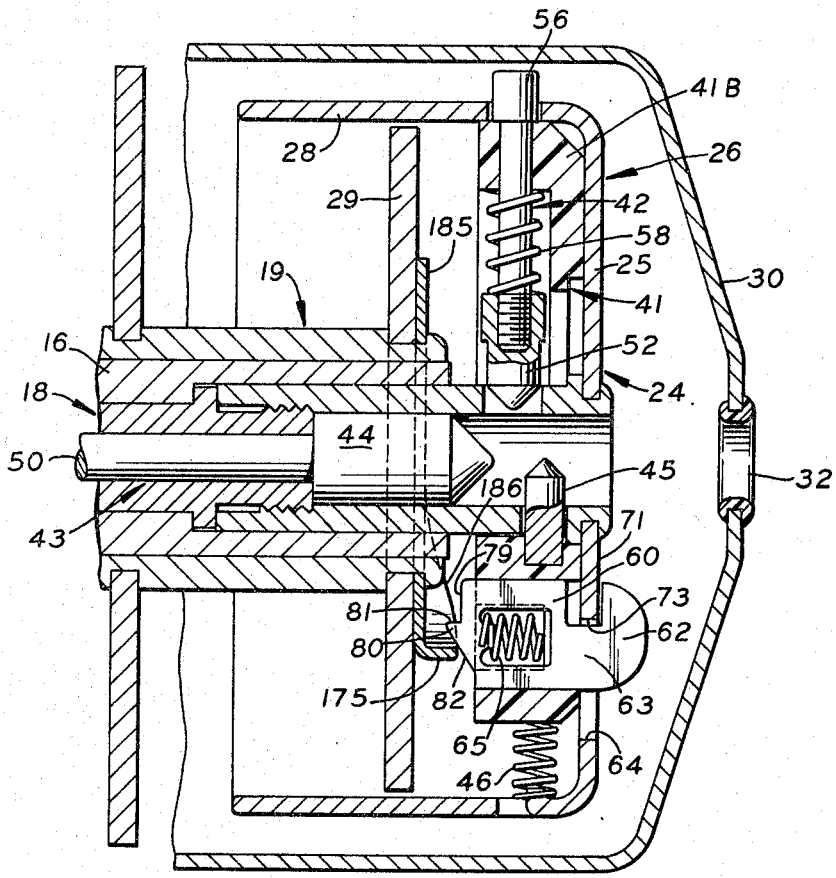
FIG. 10 is an enlarged fragmentary area of FIG. 9 depicting the holder in the radially outer position with the pickup head extended.
Figure 11:
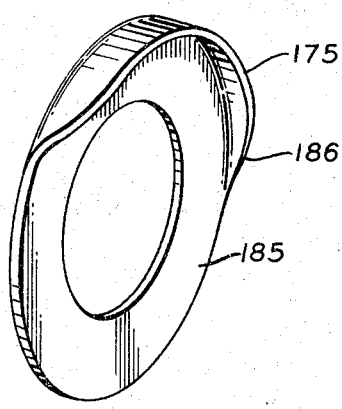
FIG. 11 is a perspective view of the release flange depicted in FIG. 10.
Figure 12:
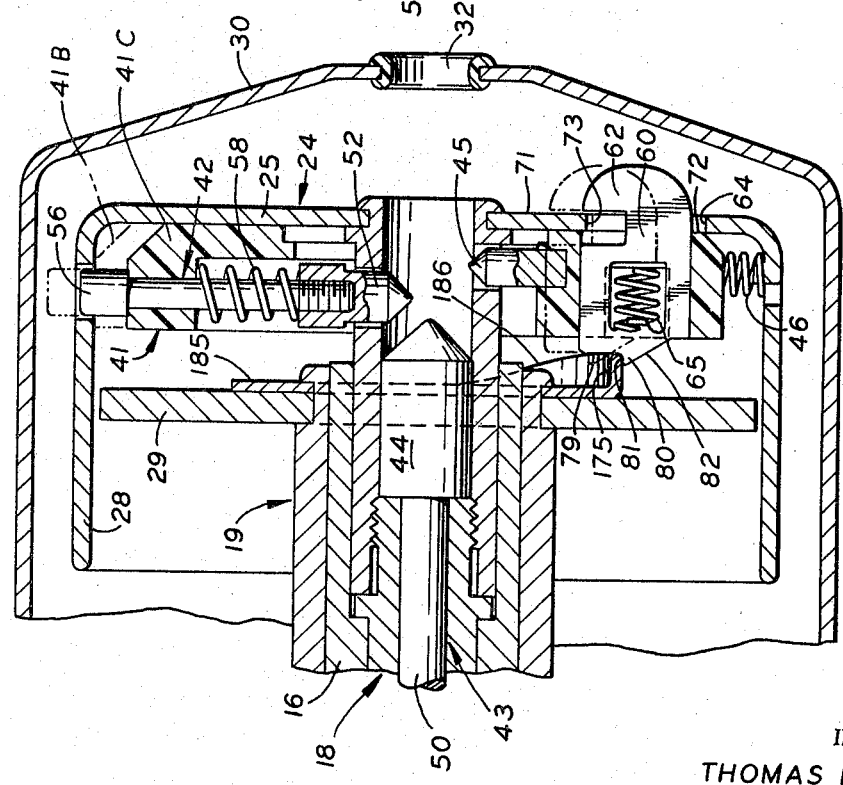
FIG. 12 is a view similar to FIG. 10 depicting, in solid line, the holder in intermediate position with the pickup head retracted and further depicting, in chain line, the movement of the latch past the release flange with the pickup head extended; and, FIG. 13 is a view similar to FIG. 12 depicting the holder in a radially inner position with the pickup head retracted.

To apply the above-described latching concept to a reel wherein the spool is not axially reciprocated, one need only construct the release flange to be annularly discontinuous. As shown in FIG. 9, the spool 119 is axially fixed on bearing 16 and the release flange 175 has a relieved portion 185 (FIG. 11) so that the annular extent thereof is discontinuous. All other components are exactly the same. Therefore, if the plunger 43 is actuated to slide the holder 41 for retraction of the pickup head 56 when the release flange 175 is in the path of the lock block 60, the cam surface 82 will cooperate with the release flange 175 to move the block forwardly until the spur 80 clears the flange 175, after which the spring 65 moves the block rearwardly to lock the holder in the intermediate position 41C by engagement of the spur 80 with the flange 175 (FIG. 12). The holder 41 will be released when the flyer 24 is rotated sufficiently to align the spur 80 with the relieved portion 185.

Figure 13:
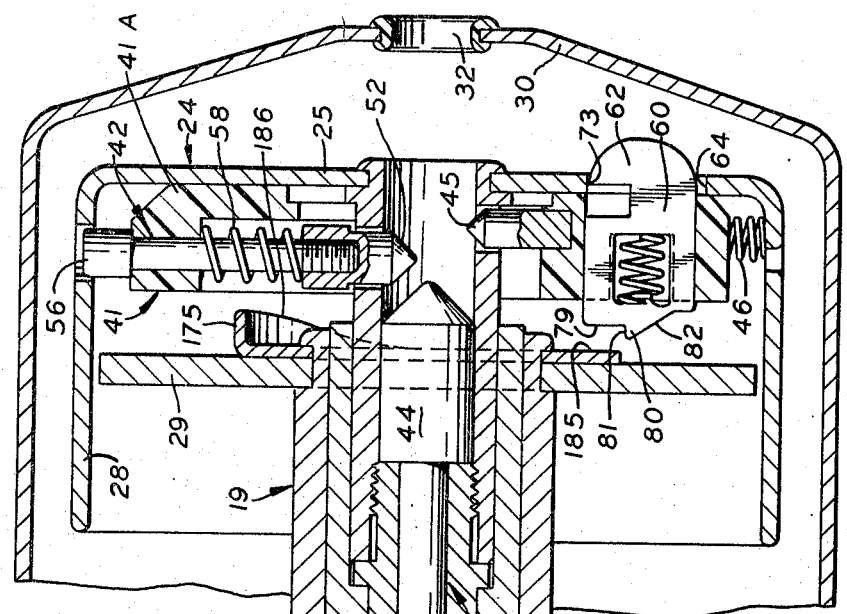

On the other hand, if the relieved portion 185 is aligned with the lock block 60 when the plunger 43 is actuated to withdraw the pickup head 56, the pawl 62 will engage the stop notch 73 to lock the holder in the inner position 41A (FIG. 13). Thereafter, rotation of the flyer 24 will bring the drive wall 79 into engagement with the smoothly curved transitional surface 186 between the relieved portion 185 and the release flange 175 to disengage the pawl 62 from the stop notch 73 and permit the holder to move from the inner position 41A to the intermediate position 41C where it is retained by contact of the spur engaging surface 81 with the release flange 175 (FIG. 12). Further rotation of the flyer 24 aligns the relieved portion 185 with the spur 80 and the holder is moved, by action of spring 46, to the outer position 41B (FIG. 3).

It should thus be apparent that a spinning reel latch mechanism constructed according to the concept of the present invention is not only uncomplicated and economical to produce but is also as readily adaptable for use with a pinching or non-pinching line snubber as well as with an axially reciprocal or axially stationary line spool.

What is claimed is:

1. In a spinning reel having a housing, a normally non-rotatable line spool, a carrier adjacent said spool and fixed to a selectively rotatable shaft, a holder mounted on said carrier and slidable between a radially inner and radially outer position, a pickup device actuated by said holder to extend radially outwardly of said carrier when the holder is in outer position and to retract inwardly of said carrier when said holder is in inner position, and a latch mechanism for retaining said holder in said inner position and selectively releasing said holder, said latch mechanism comprising, a lock block movably received in said holder, a pawl extending outwardly of said lock block and lying adjacent said carrier when said holder is in outer position, a stop notch on said carrier, a biasing means to urge said pawl into engagement with said stop notch when said holder is in inner position, a release flange affixed in said housing, rotation of said carrier engaging said lock block and release flange to disengage said pawl from said stop notch and release said holder.

2. In a spinning reel having a housing, a normally non-rotatable line spool, a carrier adjacent said spool and fixed to a selectively rotatable shaft, a holder mounted on said carrier and slidable between a radially inner and radially outer position, means biasing said holder toward said outer position, a pickup device actuated by said holder to extend radially outwardly of said carrier when the holder is in outer position and to retract inwardly of said carrier when said holder is in inner position, and a latch mechanism for retaining said holder in said inner position and selectively releasing said holder, said latch mechanism comprising, a lock block axially slidably received in said holder, a pawl axially displaced from and attached to said lock block, a biasing means urging said pawl axially toward said carrier, a stop notch on said carrier, said stop notch positioned to be engaged by said pawl only when said holder is in inner position, a release flange affixed in said housing, rotation of said carrier engaging said lock block and release flange to disengage said pawl from said stop notch and release said holder.

3. A latch mechanism for a reel, as set forth in claim 2, including means to axially reciprociate said spool, the release flange is attached to and movable with said spool and the lock block has a drive wall engageable with said release flange by the reciprocation of said spool to disengage said pawl from said stop notch.

4. A latch mechanism for a reel, as set forth in claim 2, in which the spool is axially fixed, the release flange presents an annular surface having a relieved portion and the lock block has a drive wall engaged by said release flange upon rotation of said carrier to disengage said pawl from said stop notch.

5. In a spinning reel having a housing, a normally nonrotatable line spool, a carrier adjacent said spool and fixed to a selectively rotatable shaft, a holder mounted on said carrier and slidable between a radially inner and radially outer position, means biasing said holder toward said outer position, a pickup device actuated by said holder to extend radially outwardly of said carrier when the holder is in outer position and to retract inwardly of said carrier when said holder is in inner position, and a latch mechanism for retaining said holder in said inner position and selectively releasing said holder, said latch mechanism comprising, a way provided axially through said carrier, a lock block slidably received in said way, an access slot through said carrier, a stop notch formed on said carrier, a pawl spaced outwardly of said lock block and joined thereto through said access slot, a biasing means to urge said pawl into engagement with said stop notch when said holder is in the radially inner position, a drive wall on said lock block oppositely of said pawl, a release flange radially fixed in said housing, rotation of said carrier engaging said drive wall and said release flange to disengage said pawl from said stop notch.

6. In a spinning reel having a housing, a normally nonrotatable line spool, a carrier adjacent said spool and fixed to a selectively rotatable shaft, a holder mounted on said carrier and slidable between a radially inner and radially outer position, means biasing said holder radially toward said outer position, a pickup device actuated by said holder to extend radially outwardly of said carrier when the holder is in outer position and to retract inwardly of said carrier when said holder is in inner position, and a latch mechanism for retaining said holder in said inner position and selectively releasing said holder, said latch mechanism comprising, a way provided axially through said carrier, a lock block slidably received in said way, an access slot through said carrier, a stop notch formed on said carrier, a pawl spaced outwardly of said lock block and joined thereto through said access slot, a biasing means to urge said pawl into engagement with said stop notch when said holder is in the radially inner position, a spur extending outwardly of said lock block oppositely of said pawl, a drive wall on said lock block extending radially of said spur, a beveled cam surface on said spur oppositely of said drive wall, an annular release flange positioned in said housing radially of said bearing, rotation of said carrier engaging said drive wall and release flange to disengage said pawl from said stop notch.

7. A latch mechanism, as set forth in claim 6, including means to axially reciprocate said spool, the release flange is attached to and movable with said spool and the drive wall is engaged by said release flange during reciprocation of said spool to disengage said pawl from said stop notch.

8. A latch mechanism, as set forth in claim 6, in which the spool is axially fixed, the release flange presents an annular surface having a relieved portion and the drive wall is engaged by said release flange during rotation of said carrier to disengage said pawl from said stop notch.

9. A latch mechanism, as set forth in claim 7, in which the spur has an engaging surface oppositely of said cam surface and intersecting said drive wall, and said engaging surface is spaced a clearing distance radially outwardly of said release flange, and in which the engaging surface disengages from said release flange to permit extension of said pickup device radially outwardly of said carrier.

10. A latch mechanism, as set forth in claim 8, in which the spur has an engaging surface oppositely of said cam surface and intersecting said drive wall, and said engaging surface is spaced a clearing distance radially of said release flange, and in which the engaging surface disengages from said release flange to permit extension of said pickup device radially outwardly of said carrier.

References Cited
UNITED STATES PATENTS

| | | | |
|---|---|---|---|
| 2,854,200 | 9/1958 | Montgomery | 242—84.21 |
| 3,108,762 | 10/1963 | Murvall | 242—84.2 |
| 3,284,019 | 11/1966 | Wood | 242—84.21 |

FOREIGN PATENTS 760,981   11/1956   Great Britain.

FRANK J. COHEN, Primary Examiner.

B. S. TAYLOR, Assistant Examiner.